Aug. 9, 1932.  L. W. RAWSON  1,870,648
ACCELERATING CLUTCH
Filed Sept. 4, 1930  2 Sheets-Sheet 1

Inventor
Louis W. Rawson
By Attorneys
Southgate Fay & Hanley

Aug. 9, 1932.     L. W. RAWSON     1,870,648
ACCELERATING CLUTCH
Filed Sept. 4, 1930     2 Sheets-Sheet 2

Inventor
Louis W. Rawson
By Attorneys

Patented Aug. 9, 1932

1,870,648

UNITED STATES PATENT OFFICE

LOUIS W. RAWSON, OF WORCESTER, MASSACHUSETTS, ASSIGNOR TO WORCESTER POLYTECHNIC INSTITUTE, OF WORCESTER, MASSACHUSETTS, AN EDUCATIONAL INSTITUTION OF MASSACHUSETTS

ACCELERATING CLUTCH

Application filed September 4, 1930. Serial No. 479,708.

The principal objects of this invention are to provide a clutch which can be made in the form of a flexible coupling or in various other forms and which will operate without absorbing an excessive amount of power at the start and to provide a clutch in which the driven side, or the machine to be driven, will be brought up to speed at substantially uniform acceleration and in which provision may be made whereby the clutch will transmit the amount of power desired and additional provision can be made for the overload.

Other objects and advantages of the invention will appear hereinafter.

Reference is to be had to the accompanying drawings, in which

Numerous clutches have been designed operating on the principle utilizing centrifugal force for gradually picking up the driven member and this one is designed to provide a clutch very efficient for this purpose with comparatively small expense and few moving parts without springs or levers.

Figure 1:
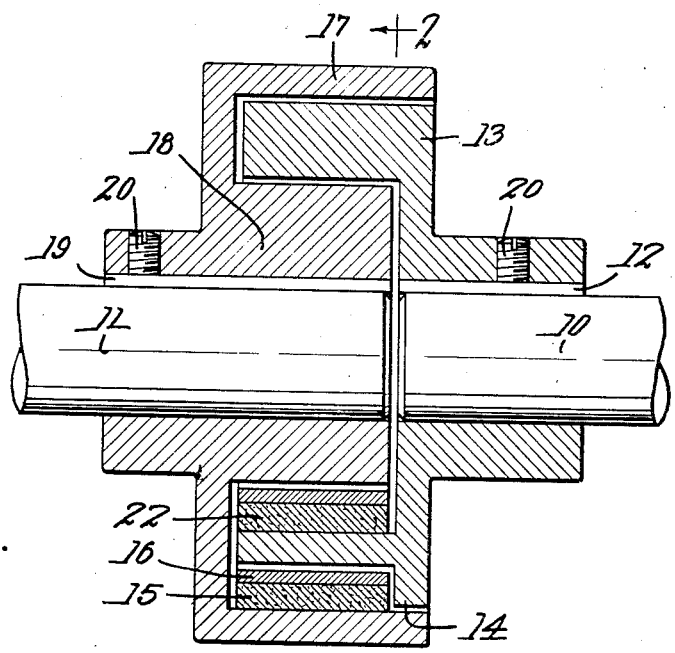
Fig. 1 is a sectional view of a clutch constructed in accordance with this invention in the form of a coupling.
Figure 2:
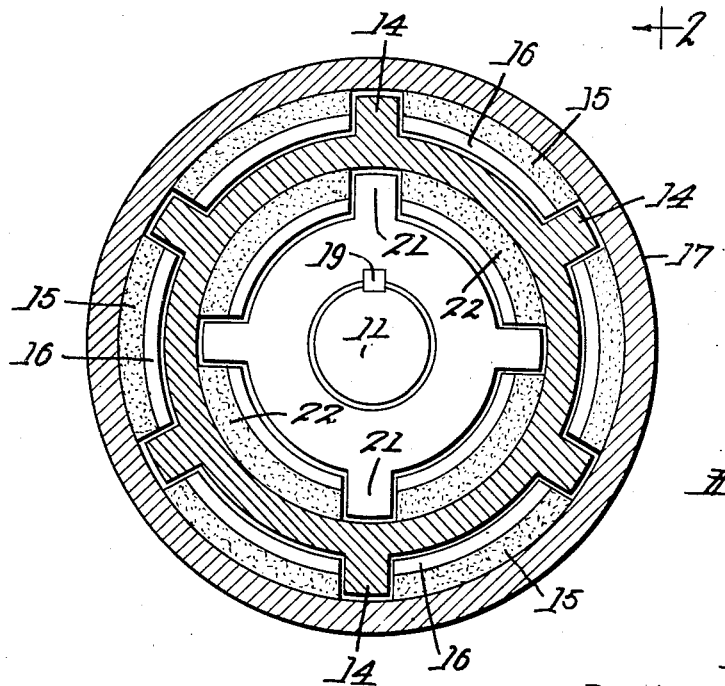
Fig. 2 is a sectional view of the same on the line 2—2 of Fig. 1.

In the form shown in Figs. 1 and 2, the simplicity of this clutch is shown by the fact that it is designed in the form of a flexible coupling. The driving shaft 10 and driven shaft 11 are arranged end to end and the driving shaft is provided with a key 12 by which is secured to it a clutch member 13. This clutch member is provided with radial walls 14 at intervals and between these walls are located loose centrifugal friction shoes 15 which may be weighted by lead inserts 16.

In the form shown, the friction shoes are made of any desired friction material as standard brake lining, molded asbestos or any other friction material and the lead parts are located in this instance on the inner or back side. The friction lining may be in one piece if desired fastened to the inside of the device with cast iron, steel or other material on its outer surface used for the friction or, when it is necessary to have greater pressure than this friction lining will give, it may be reenforced as stated by placing the shoes in a mold and pouring in the lead backing 16 or the like. These friction shoes are entirely free and without springs or levers.

Obviously on the rotation of the driving shaft the shoes will be thrown outwardly and they come into contact with the driven hub member 18 which has a cylindrical projection 17 within which these shoes are located and also the cylindrical part of the hub member 13. This hub 18 is of course keyed to the driven shaft 11 by a key 19. A set screw 20 is shown for the usual purpose. This could complete the coupling.

For the purpose of taking the overload, however, the driven hub 18 may be provided with radial walls 21 between which are located friction shoes 22 which may or may not be weighted with lead or other heavy metal. These shoes 22, if they are used, are arranged to bear on the inner side of the cylindrical projecting part 13 of the hub on the driving shaft.

In the use of this coupling, the outside shoes only may be used as stated and the frictional surfaces are made of such material that this part of the clutch will transmit the desired amount of horsepower. For example, I have shown the device divided into six parts on the outside and all six shoes in position but two, three or six can be used as desired, some of them being taken out if necessary to reduce the friction surface.

The driving shaft starts first without any load. It is allowed to come to speed and the centrifugal action throws the shoes 15 out to the friction surface causing a slipping action which gradually starts up the driven shaft. These outside shoes are designed as stated to transmit power equal to the desired or normal driving power. There is no tendency to slow down the speed of the driving shaft under normal load. The capacity of the outer shoes is designed to take care of the normal load while the capacity of the inside shoes 22, if they are used, is designed to be sufficient to carry any overload which may occur.

It will be observed that the outside shoes alone would drive the driven shaft and the inside shoes are additional and will help transmit the power and they are used to take care of the overload.

The friction shoes, being unattached and free to float between the driving and driven members, provide flexibility under load, absorb shocks and compensate for want of alignment between the driving and driven shafts.

This makes a very simple device which can be designed in the form of a coupling as stated having few parts and really nothing to get out of order.

Figure 3:
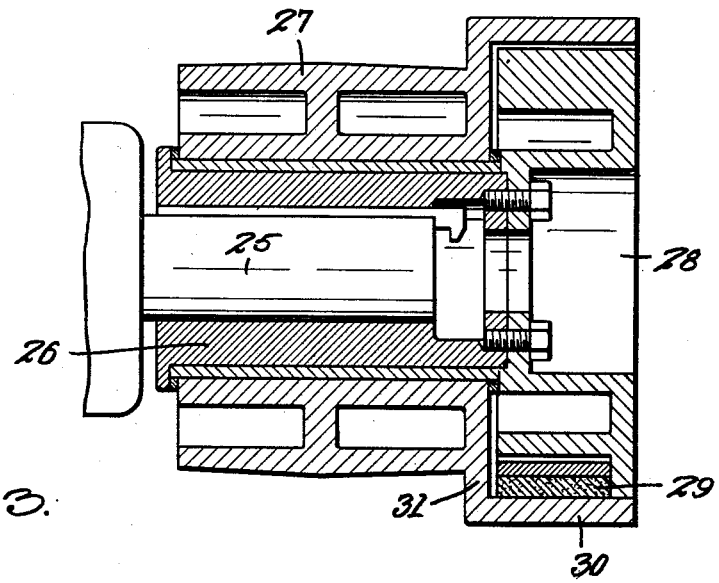
Fig. 3 is a view similar to Fig. 1 showing the employment of the same principle in the form of a pulley for transmitting the power.
Figure 4:
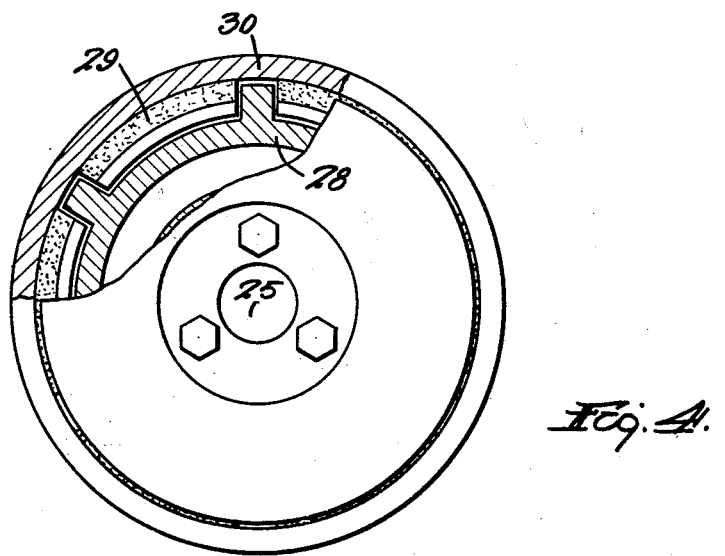
Fig. 4 is an end view of the construction shown in Fig. 3 with parts in section.

In the form shown in Figs. 3 and 4, the same idea is illustrated for use in driving a pulley. Of course this can be reversed as desired but I have shown a motor shaft 25 on which is keyed a sleeve 26 carrying the power transmitting pulley 27 rotatably thereon. This sleeve 26 has bolted to it a head 28 which is provided with centrifugal friction shoes 29 of the same character as those previously described. These bear on a cylindrical surface 30 on the inside of the clutch ring 31 either integrally connected with the pulley or bolted thereto in any desired way. I have shown only one set of shoes in this case although two sets could be used as in the other case. The pulley of course is used to represent any form of driving member such as a gear, sheave or anything else.

Although I have illustrated and described only two forms of the invention, I am aware of the fact that modifications can be made therein by any person skilled in the art without departing from the scope of the invention as expressed in the claim. Therefore, I do not wish to be limited to all the details of construction herein shown and described, but what I do claim is:—

In a clutch, the combination of a driving clutch element having a hub and a wall extending transversely therefrom, radial ribs directly axially of said element from said wall and defining, with said wall, open-ended pockets, a driven clutch element having a hub and a wall extending transversely therefrom, radial ribs directed axially of said element from said wall and defining, with said wall, open-ended pockets, said driving member being nested within the driven member, friction shoes disposed within the pockets of said driving member for positive movement therewith, said driven element having an interior cylindrical surface extending around said shoes, whereby the centrifugal force of the driving element will force the shoes out into contact with said cylindrical surface and drive the driven element therethrough by friction, a second set of friction shoes within the pockets of the driven element whereby the second set of shoes will be carried around positively with the driven element, said driving element having an interior cylindrical surface positioned to receive the pressure of said second set of shoes.

In testimony whereof I have hereunto affixed my signature.

LOUIS W. RAWSON.